Feb. 5, 1952 J. R. BOWMAN ET AL 2,584,785
PROCESS AND APPARATUS FOR SEPARATION OF MIXTURES
Filed June 14, 1948 7 Sheets-Sheet 2

INVENTORS
JOHN R. BOWMAN
MARIO T. CICHELLI
BY
*their* ATTORNEY

Feb. 5, 1952     J. R. BOWMAN ET AL     2,584,785
PROCESS AND APPARATUS FOR SEPARATION OF MIXTURES
Filed June 14, 1948     7 Sheets-Sheet 6

INVENTORS
JOHN R. BOWMAN
MARIO T. CICHELLI
BY
*A. M. Houghton*
*their* ATTORNEY

Patented Feb. 5, 1952

2,584,785

UNITED STATES PATENT OFFICE 2,584,785

PROCESS AND APPARATUS FOR SEPARATION OF MIXTURES

John R. Bowman, Pittsburgh, and Mario T. Cichelli, Forest Hills, Pa., assignors to Gulf Research & Development Company, Pittsburgh, Pa., a corporation of Delaware Application June 14, 1948, Serial No. 32,916

21 Claims. (Cl. 183—2)

This invention relates to process and apparatus for the separation or enrichment of constituents of gaseous and/or vaporous mixtures or mixtures of gases or vapors with finely divided liquid or solid particles suspended therein.

It has heretofore been common practice to separate gaseous and/or vaporous mixtures by distillation, absorption, adsorption, thermal diffusion, gaseous effusion, and atmolysis (see "Chemical Engineering Progress," February 1947, published by American Institute of Chemical Engineers, and Maier U. S. Patent No. 2,255,069). Finely divided liquid or solid particles are generally separated from gases by centrifugal separation, electrical precipitation, and in the case of solids alone, by filtration.

Distillation is the most generally used method of separating gaseous and/or vaporous mixtures; however, it requires low temperature operation for normally gaseous mixtures and does not permit the one-step separation of components which form azeotropes. Absorption and adsorption are limited in applicability. Thermal diffusion cannot be used with certain mixtures and also requires relatively large and expensive apparatus. Atmolysis and gaseous effusion have the disadvantage of requiring a porous boundary through which one of the separated gas streams must flow. Likewise, many stages connected in series are needed to permit obtaining a combination of high degree of separation and large capacity.

The commonly used methods of separating finely divided liquids and solids from gases or vapors have the limitation of high initial cost or relatively incomplete separation.

This invention has for its object to provide a separation process and apparatus whereby one or more of the foregoing difficulties can be avoided. Another object is to provide an enriching or concentrating process and apparatus having relatively high efficiency and large capacity. Another object is to provide an enriching or concentrating process and apparatus which will effectively separate or concentrate constituents which form azeotropic mixtures. A still further object is to provide a separation process and apparatus which can be operated conveniently with waste heat from industrial plants. Other objects will appear hereinafter.

These and other objects are accomplished by our invention which comprises a separation process and suitable apparatus therefor, said process including the steps of establishing a substantially unobstructed flow of sweep vapor through a separating zone, distributing the gas mixture which is to be separated, in the separating zone, removing part of said vapor by causing it to undergo a change of phase in a region of removal within the separating zone, thereby establishing a concentration gradient in the separating zone, and withdrawing at least two streams of different compositions from the separating zone at different distances from said region of removal.

In order to avoid confusion, in the description and claims we will refer to the mixture to be separated as a gas mixture and to the separated components as gases. It is known that gases, vapors and fine solid or liquid particles which approach molecular size such as colloids suspended therein do not differ in a strict physical sense from each other, i. e. vapors differ from gases only in that they are derived from normally liquid substances and small particles of the size of colloids differ from gas molecules only in that they are somewhat larger in size, and as will be apparent from the following description our invention is applicable to all such mixtures. The terms "gas mixture" or "gas" when used herein or in the claims to identify the mixture to be separated or the components thereof are therefore to be understood to include gases, vapors and fine particles suspended in gases or vapors.

In the following examples and description we have set forth several of the preferred embodiments of our invention but it is to be understood that they are given by way of illustration and not in limitation thereof.

In the accompanying drawings.

Figures 1, 4:
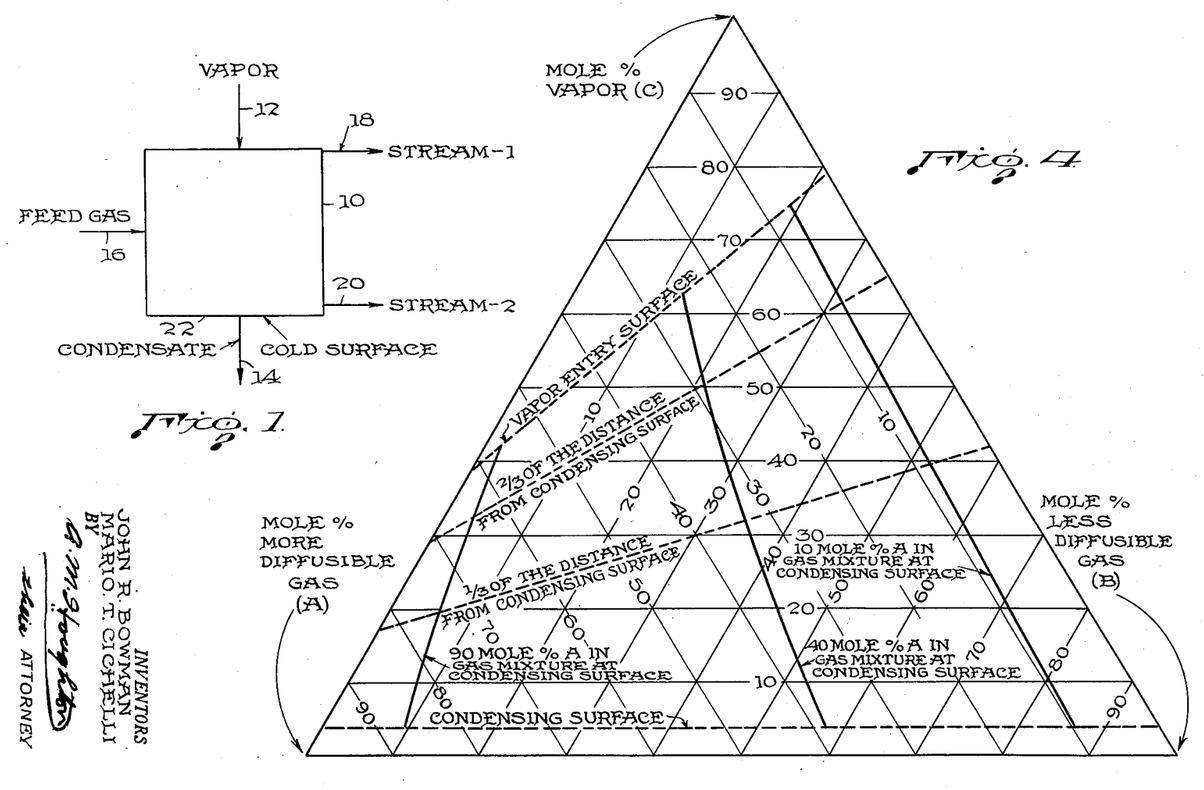
Figure 1 is a diagrammatic elevation of a single stage apparatus in which our separation process can be carried out and which will be referred to primarily for the purpose of explaining the principles of the invention.
Figure 4 is a triangular plot showing in another manner information of the type presented in Figure 2.

We will first describe the principles of operation of our invention in connection with a single stage apparatus such as illustrated in Figure 1 and while we will explain the action which appears to be responsible for the separation in accordance with our invention it is to be understood that our invention is not limited to any theory of operation.

For simplicity, the description will first be concerned with the separation of the components of a binary gaseous mixture. Referring to Figure 1 numeral 10 designates a rectangular enclosed casing forming a separating zone or chamber. Numeral 12 designates a conduit for introducing a vapor into casing 10. Numeral 14 designates a conduit for removing condensate from casing 10 and numeral 16 indicates a conduit for introducing the gas mixture to be separated into casing 10. Numeral 18 designates a conduit for removing a stream enriched with respect to the more diffusible component of the gas mixture and conduit 20 is provided for removing a stream enriched with respect to the less diffusible component of the gas mixture from the casing 10. Numeral 22 indicates the base of casing 10, which serves as a condensing surface and is therefore cooled by any suitable means (not shown).

During the operation of the apparatus illustrated in Figure 1 vapor such as steam introduced through conduit 12 fills casing 10. Part of this steam is caused to undergo a change in phase by condensing on surface 22 and is removed through conduit 14 in the form of water. A flow of vapor through the chamber from conduit 12 to the condensing surface is thus established. The gas mixture introduced through conduit 16 is distributed in chamber 10. The molecules of this gas mixture diffuse through the steam in chamber 10 at a rate depending upon their diffusivity.

The diffusivity of one gas through another is defined as the molecular rate of flow of the one gas per unit time through a unit cross-sectional area perpendicular to the flow, when the molecular concentration differences along a unit distance parallel to the flow is unity. Thus, for example, the values of the diffusivity of hydrogen and of carbon dioxide through steam at one atmosphere and 0° centigrade are 0.7516 and 0.1387 square centimeter per second respectively (data from International Critical Tables, volume V, page 62, 1929). Since the steam molecules tend to pass from conduit 12 toward the condensing surface, the less diffusible component of the gas mixture will develop a larger concentration gradient parallel to the steam flow than will the more diffusible component. This causes the gas near the condensing surface 22 to become enriched with respect to the less diffusible component of the gas mixture while the gas in a zone farther removed from the condensing surface becomes enriched with respect to the more diffusible component. The steam, in effect, sweeps or carries preferentially the less diffusible molecules of the gaseous mixture toward the condensing surface. When we speak herein of more and less diffusible components we mean that they are more and less diffusible through the actuating or working vapor used for the separation. The more diffusible and the less diffusible components therefore can be removed in concentrations greater than contained in the feed mixture through conduits 18 and 20, respectively.

This separation is not due to a density effect since the apparatus illustrated could be up-ended so that the cool surface would be at the top. The less diffusible component then would be removed from the top and the more diffusible from the bottom. This mode of operation is less convenient since it is more difficult to collect and withdraw condensate. However, this could be taken care of by using a surface which will freeze the condensate or by providing a domed top condenser on which the condensate would flow to a collecting gutter at the periphery. Since the separation is determined by the relative diffusivity in the gas or vapor phase it will be clear that azeotropic mixtures can be separated in this way.

While we prefer to employ a condensable vapor and to remove it by condensation any substance in the gaseous phase which is selectively removable from gas mixtures containing it by means such as condensation, adsorption, absorption, freezing or chemical reaction may be employed. Thus, ammonia, if used as a sweep vapor could be removed by reaction with a sulphuric acid curtain. The term "vapor" as used in the claims therefore is to be understood to designate such selectively removable materials which are in the gaseous phase. From the foregoing it will be apparent that when we refer to removal of the vapor by causing it to undergo a change in phase we mean changing the vapor from a gas to a liquid or solid by such procedure as condensation, adsorption, absorption, freezing or chemical reaction.

Figure 2:
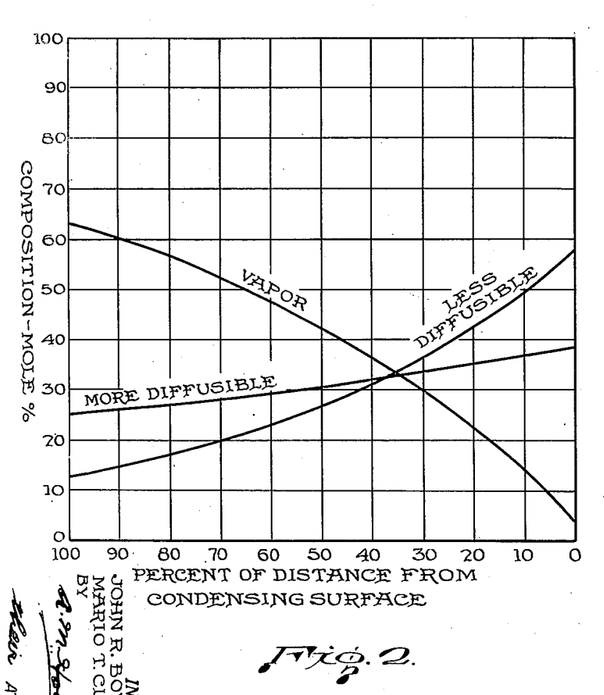
Figure 2 is a two-coordinate graph showing a concentration distribution obtained for a two component gaseous mixture in a single stage apparatus such as illustrated in Figure 1.

Figure 2 shows the concentration distribution obtained in a single-stage apparatus, such as illustrated in Figure 1, wherein the components of a binary mixture of gases are being separated, provided the gas flow is so small or the distance between the zone of introduction of the gas mixture and removal of the separated gases is so great that steady state compositions are established at every point of elevation from the condensing surface. The vapor concentration decreases in the direction of its diffusion. The components of the gas mixture are stagnant at steady state, their concentration profiles depending on the relative diffusivities of the vapor through each of them (or of each of them through the vapor, for the diffusivity of A through B equals the diffusivity of B through A). Both components of the gas mixture increase in concentration as the condensing surface is approached, but the less diffusible gas increases in concentration more rapidly than the more diffusible gas. Thus, the ratio of concentrations of less diffusible gas to more diffusible gas is higher at the condensing surface than at the vapor entry surface.

Figure 3:
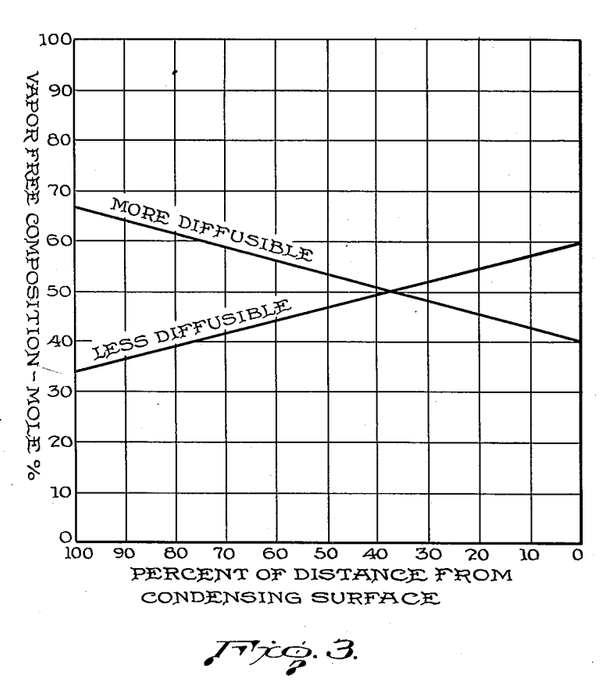
Figure 3 is a replot of Figure 2 showing the mol fractions of each component on a vapor-free basis.

Figure 3 is a replot of Figure 2, showing mol percentages of each component of the gas mixture on a vapor-free basis as a function of distance from the condensing surface. For the example presented, these lines have no apparent curvature. Mathematical analysis of the problem shows, however, that a trace of curvature actually exists in each line, with a point of maximum steepness for both curves at their intersection. The establishment of a concentration gradient as mentioned herein and in the claims signifies the attainment of a change in concentration, on a vapor free basis, with distance, as is shown in Figure 3.

Figure 4 is a triangular plot showing in another manner information of the type presented in Figure 2. The central curve of Figure 4 is a replot of the curves shown in Figure 2, while the other two curves correspond to identical vapor rates, condensing temperature, and diffusion distance, differing only in the composition of the gas at the vapor condensing surface. This composition, on a vapor-free basis, is given in Figure 4 as mol per cent of more diffusible component in the gas mixture at the condensing surface. The coordinates of the triangular diagram are mol per cent vapor, mol per cent less diffusible gas, and mol per cent more diffusible gas. The upper extremities of each curve correspond to the composition of the ternary mixture at the vapor entry plane. The path that each curve takes represents concentrations of each component at various positions between the vapor entry and condensing surfaces. As the vapor condensing surface is approached, the concentration of the vapor decreases and the concentration of the less diffusible component, on a vapor-free basis, increases. The lower extremity of each curve is the composition at the vapor condensing surface. The dashed lines, corresponding to one-third and two-thirds of the distance between the condensing surface and the vapor entry surface and the dashed line at the vapor entry and condensing surfaces are straight.

Figures 5, 6, 6A:
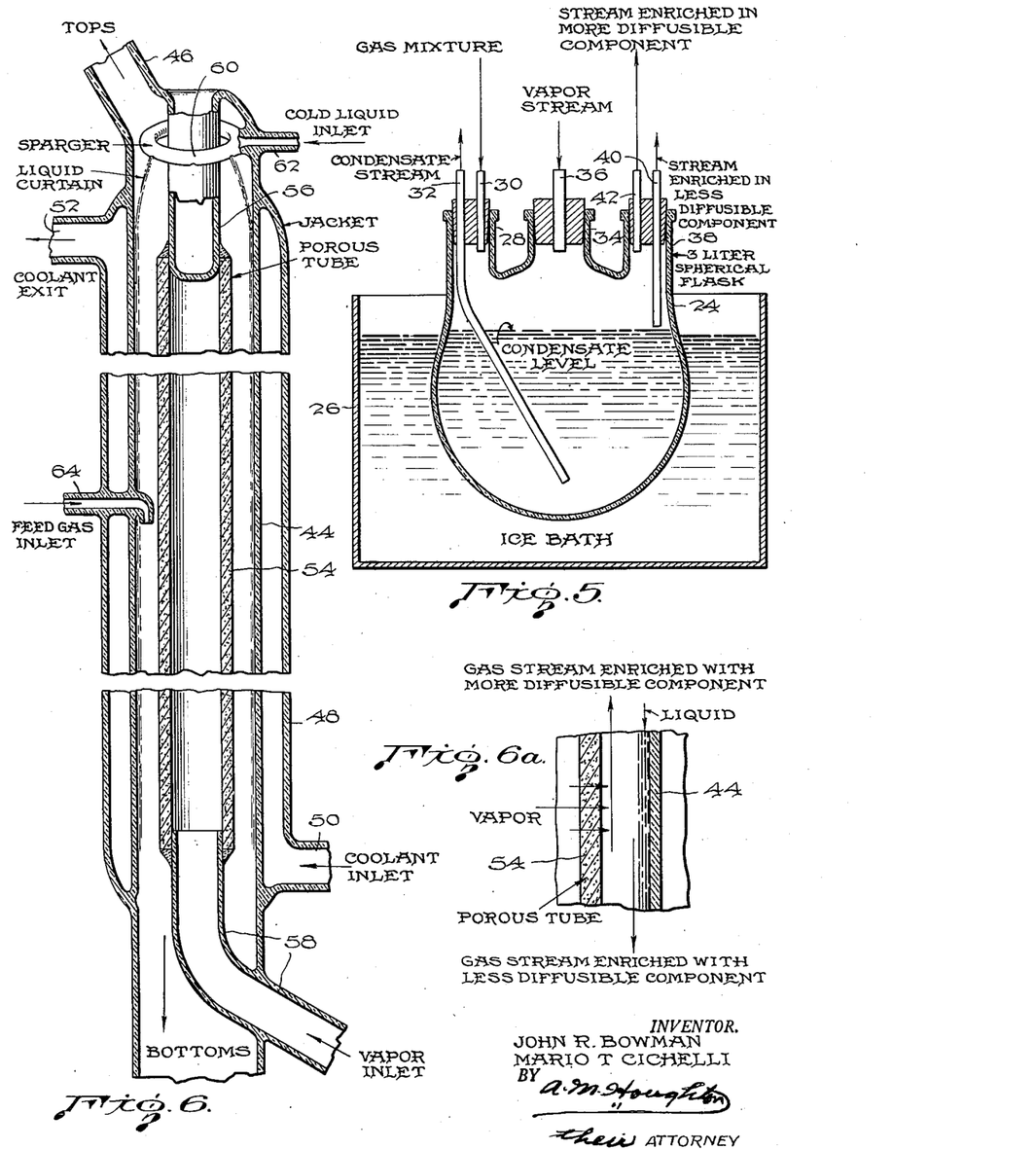
Figure 5 is a vertical section of an experimental single stage apparatus for separating gas mixtures in accordance with our invention.
Figure 6 is a vertical section of an experimental differential multistage gas separating apparatus in which the vapor stream flows radially outward.
Figure 6a is an enlarged detail of a portion of the separating zone in the apparatus of Figure 6.

Referring to Figure 5, numeral 24 designates a triple necked, round bottom flask forming a separating zone, which flask is positioned in a container 26 containing ice and water. The neck 28 of the flask is closed with a stopper provided with two perforations through which conduits 30 and 32 pass. Neck 34 is provided with a stopper and conduit 36 while neck 38 is provided with a stopper and two conduits 40 and 42. The operation of the apparatus shown in Figure 5 is much the same as described above in connection with Figure 1. The vapor stream, such as steam, is introduced through conduit 36 and is condensed on the cold body of condensate in the bottom of the flask. Excess condensate is continuously withdrawn through conduit 32. The gas mixture to be separated is introduced through conduit 30, a stream enriched in the less diffusible component is withdrawn through conduit 40, and a stream enriched in more diffusible component is withdrawn through conduit 42. Experimental results of two operations carried out in this apparatus will be found below in Example I.

Referring to Figures 6 and 6a, numeral 44 designates an elongated glass cylinder closed at the upper end and provided with a withdrawal conduit 46. Numeral 48 designates a cylinder which is approximately concentric with 44 and which is integral therewith at its upper and lower extremities so as to provide a cooling jacket through which cooling fluid may be introduced by way of conduit 50 and withdrawn by way of conduit 52. Numeral 54 designates a cylinder, composed of a porous material such as Alundum, which is maintained in the approximate center of cylinder 44 by centering projection 56 and conduit 58. Numeral 60 designates a circular sparger or spray nozzle provided with a plurality of openings so positioned as to direct liquid onto the inside upper wall of cylinder 44. Numeral 62 designates a conduit for introducing liquid into the sparger 60. Numeral 64 designates a conduit for introducing the gas mixture to be separated.

In operating the apparatus illustrated in Figure 6 cooling liquid such as water is introduced through conduit 62 and sparger 60 and caused to flow as a film down the inside wall of cylinder 44. Vapor such as steam is introduced through conduit 58 into porous cylinder 54 through which it passes into the separating chamber. This vapor then passes radially to cylinder 44 in more or less uniform amounts per unit area, and is condensed on the downwardly flowing film of cooling liquid on the wall of cylinder 44. Cooling fluid, when used in jacket 48, is introduced by way of conduit 50 and removed through conduit 52. The gas mixture to be separated is introduced through conduit 64. This mixture diffuses through the body of steam in the separating zone between the porous cylinder 54 and cylinder 44. The more diffusible part of the gas is less affected by steam molecules than the less diffusible as explained above in connection with Figure 1. Therefore, at any elevation in the apparatus the less diffusible is found in higher concentration on a vapor-free basis near the wall of cylinder 44 than in other zones of this elevation while the more diffusible is found in higher concentration on a vapor-free basis near the wall of porous conduit 54. The downwardly flowing water film tends to drag downward with it the gas immediately adjacent to it, which is enriched in the less diffusible component. In the section of the column above the feed gas inlet, at steady state there will be an upflow of gas at an elevation equal to the sum of the downflow rate at that elevation and the flow rate out the top through conduit 46. This gas stream will be flowing upward along the outside wall of porous cylinder 54, as shown in Figure 6a. At the top of the column, therefore, part of the upflowing gas stream reverses its direction and flows down adjacent to the water film while the rest flows out conduit 46 as top product. A similar occurrence takes place at the bottom of the column. Part of the downflowing gas stream reverses its direction and flows upward adjacent to the porous tube while the rest flows out of cylinder 44 as bottom product. Because of the cross flowing steam, the gas stream flowing downward near the water film is continually enriched in less diffusible component in its progress down the tube while the gas stream flowing upward near the porous tube is continually enriched in more diffusible component in its progress up the tube. Separations in the apparatus illustrated in Figure 6 are described below in Examples 2 and 3.

Figures 7, 7A, 9:
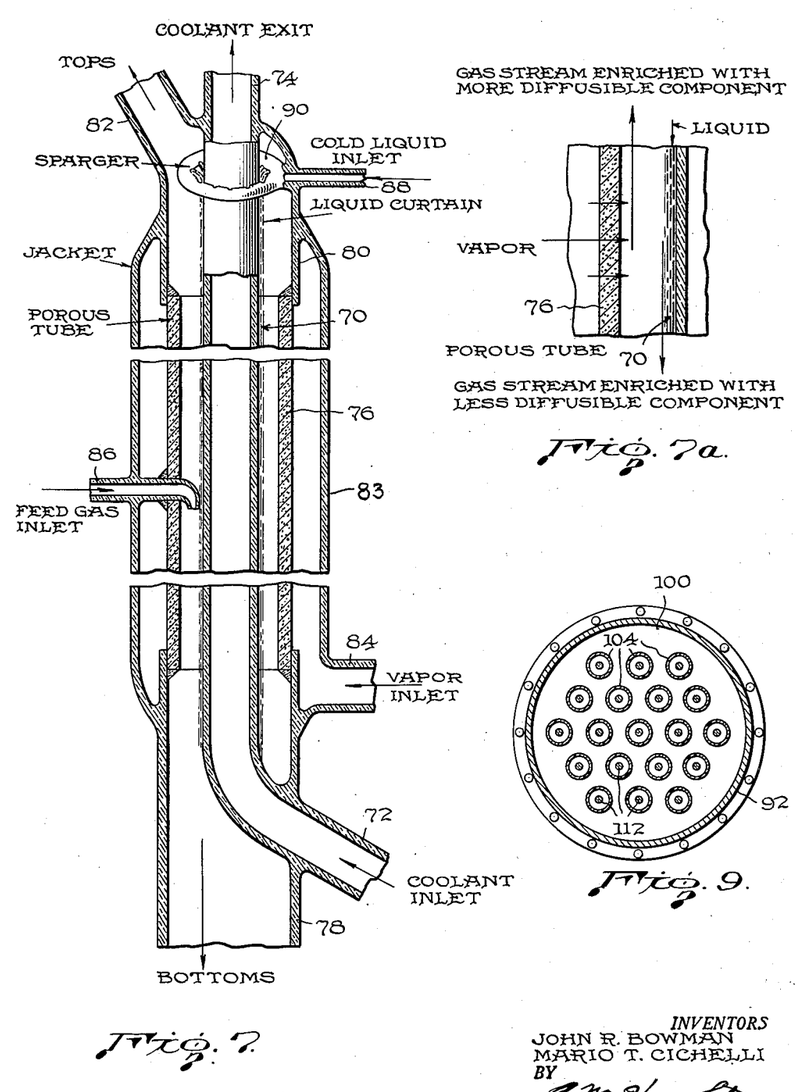
Figure 7 is a vertical section of a multistage experimental gas separation apparatus in which the vapor stream flows radially inward.
Figure 7a is an enlarged detail of a portion of the separating zone in the apparatus shown in Figure 7.
Figure 9 is a horizontal section taken on line 9—9 of the multistage separating unit of Figure 8.

Referring to Figure 7, numeral 70 designates a cylinder having a bend at the lower extremity through which cooling fluid may be circulated by introduction at 72 and withdrawal at 74. Numeral 76 indicates a porous cylinder which surrounds cylinder 70 and is maintained in the position shown by integral cylindrical extensions 78 and 80 at the bottom and top thereof, respectively. A conduit 82, integral with extension 80, is provided at the top of the apparatus for withdrawal of separate more diffusible gas. Numeral 83 indicates a cylindrical jacket surrounding porous cylinder 76 and numeral 84 a conduit positioned near the base of cylindrical jacket 83 for the introduction of condensable vapor. Numeral 86 indicates a conduit for introducing the gas mixture into the annular space between cylinders 70 and 76 and numeral 88 designates a conduit for introducing a cold liquid into sparger 90 which evenly distributes this liquid on the outside wall of cylinder 70.

In operating the apparatus illustrated in Figure 7 cooling liquid is introduced through conduit 88 and sparger 90 and is caused to flow down the outside wall of 70 as a uniform film. This liquid then flows into the bottom of conduit 78 and is withdrawn. Steam or other condensable vapor is introduced through conduit 84 and passes through porous cylinder 76 to the condensing surface 70 where it condenses and is removed with the cooling liquid. The gas mixture to be separated is introduced through conduit 86 and a concentration gradient of the components of this mixture is established in the annular space between cylinder elements 70 and 76. However, the concentration gradient is the reverse of that described in connection with Figure 6, i. e., the more diffusible component becomes concentrated near the outer wall and the less diffusible component becomes concentrated near the center cylinder 70. As before the more diffusible component becomes enriched in the up-flowing stream and is removed at the top, while the less diffusible component is removed at the bottom (as shown in Figure 7a).

Figure 8:
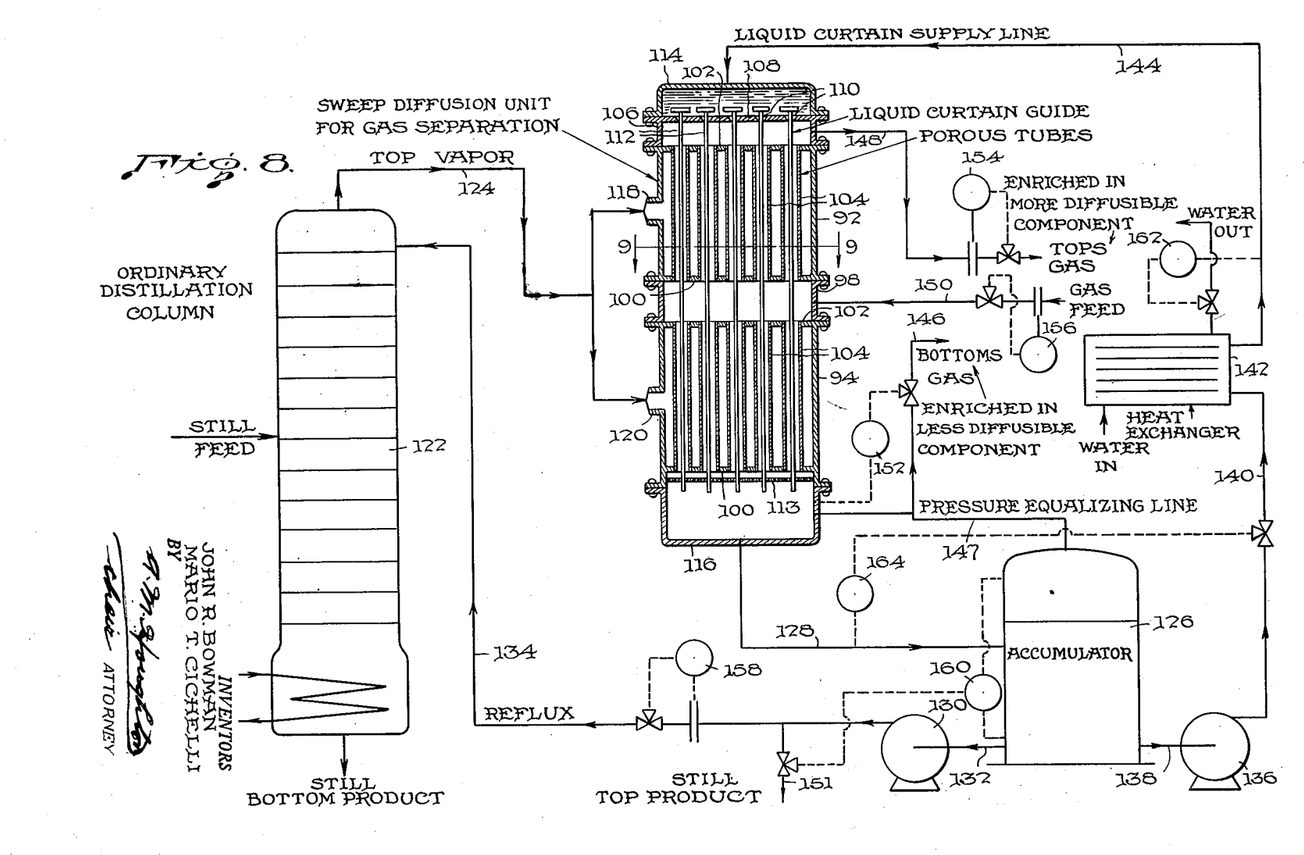
Figure 8 is a diagrammatic elevation partly in section of differential multistage apparatus for separation of constituents of a gas mixture utilizing the waste heat energy in fractionated vapors from an ordinary distillation column to effect the separation.

Referring to Figures 8 and 9, numerals 92 and 94 are cylindrical casings, 92 being superimposed upon 94 and connected thereto by a spacer 98. Cylinders 92 and 94 are each provided with lower and upper end plates 100 and 102 which are perforated symmetrically and into which perforations are mounted a plurality of porous cylinders 104. Sections 92 and 94 are assembled so that cylinders 104 in section 92 are directly above cylinders 104 in section 94. Numeral 106 designates a cylindrical spacing element mounted above 92 and provided with plate 108 having a plurality of perforations 110 in which are mounted guide rods or tubes 112 which extend from above plate 108 to below the bottom plate 100 of section 94. If guide tubes are used it may be desirable to circulate coolant through them. Numeral 113 designates a perforated screen-like centering plate at the base of section 94. Guide rods 112 are maintained in the approximate center of cylinders 104 by the openings in plates 108 and 113. Numeral 114 designates a cap which cooperates with plate 108 to form a reservoir at the top of the separation unit. Numeral 116 designates a casing for closing the base of the separating unit. Numerals 118 and 120 designate conduits for introducing actuating vapor into sections 92 and 94, respectively. This vapor is derived from a fractionating still 122 and constitutes the top fraction withdrawn through conduit 124 which connects to conduits 118 and 120.

Numeral 126 indicates an accumulator for condensed actuating vapor and cooling liquid, which liquid is withdrawn from casing 116 by way of conduit 128. Numeral 130 designates a pump the intake of which is connected to the base of the accumulator 126 by conduit 132. This pump serves to return reflux to still 122 by way of conduit 134. Numeral 136 designates a pump for withdrawing liquid from accumulator 126 by way of conduit 138 and delivering this liquid through line 140, heat exchanger 142 and line 144 to the reservoir 114 at the top of the separating apparatus. Numeral 146 designates a conduit connected to the base of the unit for removing less diffusible components contained in the gaseous mixture. This conduit is connected to conduit 147 leading to the top of accumulator 126 in order to equalize the pressure in the separating unit and the accumulator. Numeral 148 designates a conduit for removing more diffusible components and conduit 150 is provided for introducing the gaseous mixture to be separated into the separating sections 92 and 94. The distilled fraction is withdrawn through conduit 151.

While the operation of apparatus of this kind could be controlled manually it could be best regulated by automatic devices. We have accordingly indicated such automatic controls in the drawings. The rate of removal of the less diffusible and more diffusible components and the pressure in the system would be controlled by automatic pressure control 152 and automatic flow control 154, while the rate of introduction of the gas mixture to be separated would be regulated by automatic flow control 156. The rate of return of reflux to the still 122 would be determined by automatic flow control 158, while the rate of removal of still fraction would be determined by the automatic liquid level control 160. The temperature of the cooling liquid flowing through conduit 144 would be determined by temperature control 162 which would regulate the amount of cooling water delivered to heat exchanger 142. The rate of liquid flow through conduit 144 is controlled by temperature control 164 actuated by the temperature of the condensate-cooling liquid mixture in conduit 128.

In operating the apparatus illustrated in Figures 8 and 9, the top fraction from still 122 is withdrawn in vapor form through conduit 124 and is introduced into separating sections 92 and 94 through conduits 118 and 120. These vapors flow through porous cylinders 104 and thence through the separating zone toward rods 112 where they are condensed. This condensate flows down the rods, through screen 113, into base 116 and is withdrawn through conduit 128 and delivered into accumulator 126. Part of this condensate is withdrawn from accumulator by pump 130 and delivered through conduit 134 back to still 122 for reflux purposes. A portion of the liquid condensate in the accumulator is withdrawn by pump 136 and is delivered to the reservoir 114 at the top of the separating device after passage through conduits 140, heat exchanger 142 and conduit 144. This cool liquid flows from 114 down the rods 112 as a uniform film and serves to condense the vapors passing through porous tubes 104 as described above.

The gas mixture to be separated passes through conduit 150 and flows upwardly and downwardly in the annular space between the porous tubes 104 and condensing rods 112. The separating action takes place as described above, the more diffusible component collecting near the walls of porous tubes 104 and flowing upwardly and being removed through conduit 148 and the less diffusible components collecting near rods 112 and being carried along with the liquid flowing thereon into the base 116 from which they are removed by way of conduit 146. The final still fraction is removed through the conduit 151.

The vapors removed from distillation columns have a certain amount of available energy which is wasted in ordinary condensers. It can be seen that this energy can be used to separate components of a gas mixture at negligible power cost in the apparatus of Figures 8 and 9. The only additional power expenditure required is the negligible amount necessary for recirculating liquid to form the liquid cooling curtain. If steam or some other vapor is preferred for the gas separation the distillation column overhead may be sent to a heat exchanger to generate the desired vapor. It is evident that such waste heat energy from other sources such as from steam engines and turbines may be used in this manner.

In certain cases, such as with apparatus having considerable length, it may be advantageous to use hollow tubes in place of solid guide rods 112, so that the liquid would flow down the inside and outside of walls of 112. Also the outside surface of rods 112 may be roughened, grooved or finned to provide a more uniform downwardly flowing film on the outside surface. It is important with apparatus such as illustrated in Figure 8 to distribute vapor, feed gas and liquid uniformly to all of the separating tubes and to withdraw the gas at equal rates from all of the tubes. This prevents channeling which is detrimental to good separation.

Apparatus such as illustrated in Figures 6 to 9 have the advantage that they accomplished the same result as a plurality of single stages, such as shown in Figure 5, connected in series. This is due to the fact that in the apparatus of Figures 6 to 9, there are streams in mutual contact flowing counter-current to each other between which there is continual interchange of material with consequent multiplication of the separation produced at any point. It is advisable to avoid turbulence in these countercurrent flowing streams as much as possible. This can be accomplished by introducing the vapor and the gas mixture through a plurality of openings and/or at a rate just below that at which turbulence results. An alternative method of avoiding turbulence is illustrated in Figures 10 and 11 where the vapor and gas mixtures are introduced through annular openings at a rate corresponding to streamline flow and in a direction more or less parallel with the flowing streams.

Figures 10, 11:
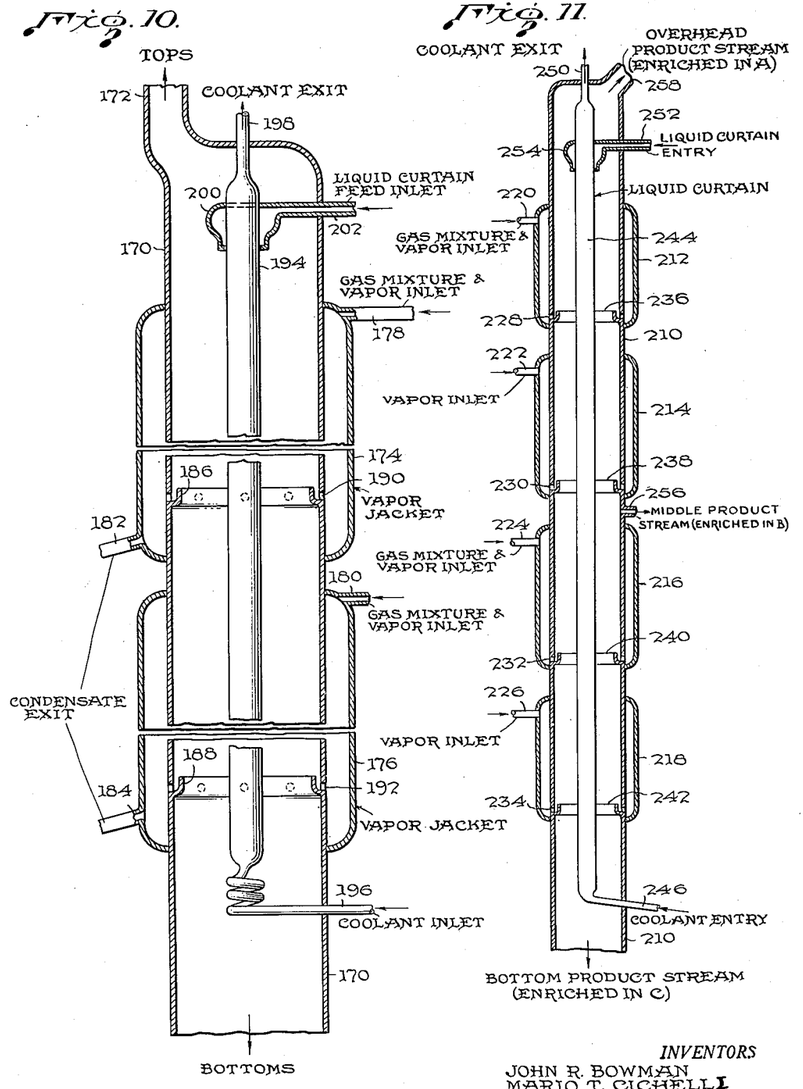
Figure 10 is a vertical section of a multistage apparatus in which the working vapor is introduced in streamline flow.
Figure 11 is a vertical section of apparatus adapted to separate three components of a gas mixture.

Referring to Figure 10, numeral 170 designates a cylindrical casing provided at the top with an integral withdrawal conduit 172. Numerals 174 and 176 designate integral cylindrical jackets surrounding portions of cylinder 170 provided respectively with introduction conduits 178 and 180 and withdrawal conduits 182 and 184. Numerals 186 and 188 indicate upwardly turned baffles integral with inside wall of cylinder 170. Numerals 190 and 192 designate perforations in the wall of cylinder 170 providing a passageway for fluid from jackets 174 and 176, respectively, into the space between baffles 186 and 188 and the wall of cylinder 170.

Numeral 194 designates a hollow cylindrical member positioned approximately concentric with cylindrical casing 170 which is provided at the lower end with a conduit 196 for introducing cooling fluid and with a conduit 198 at the upper end for removing cooling fluid. Numeral 200 designates a liquid distributor to which is connected conduit 202 for introducing a liquid film or curtain on to the outside upper wall of concentric cylinder 194.

In operating the apparatus illustrated in Figure 10 a vapor such as steam is introduced through conduits 178 and 180. This vapor passes through openings 190 and 192 and is deflected upwardly by baffles 186 and 188. The gas mixture to be separated is mixed with the vapor introduced through conduit 178 or conduit 180. The vapor passes toward concentric cylinder 194 and is condensed thereon or removed by the liquid curtain on cylinder 194. This curtain is formed by liquid introduced through conduit 202 and spread on the upper part of 194 by liquid distributor 200. The removed or condensed vapor and the liquid curtain flows downwardly over the outer surface of 194 and is removed from the bottom of casing 170. Cooling fluid, when necessary, is introduced through conduit 196 and is removed through conduit 198. Any condensable vapor which condenses in jackets 174 and 176 is removed by way of conduits 182 and 184, respectively. The separating action described above takes place in the usual manner, the more diffusible component collecting near the wall of casing 170 while the less diffusible component collects near the liquid curtain on central conduit 194. Due to the dragging action of the down-flowing liquid curtain, the stream enriched with respect to the less diffusible component is caused to flow toward the bottom of the apparatus and is removed from the bottom of casing 170. The stream enriched with respect to more diffusible component is caused to rise by the displacing action of the down-flowing stream, and is removed through conduit 172. Baffles 186 and 188 direct the vapor and gas mixture into the separating space without a large amount of turbulence as mentioned above.

Referring to Figure 11, numeral 210 designates a long cylindrical casing provided with heating jackets 212, 214, 216 and 218, which jackets are provided with vapor introduction conduits 220, 222, 224 and 226, respectively. Numerals 228, 230, 232 and 234 designate openings passing respectively from the spaces between jackets 212, 214, 216 and 218 through the wall of cylinder 210. Numerals 236, 238, 240 and 242 designate baffles positioned opposite openings 228, 230, 232 and 234, respectively. Numeral 244 designates a hollow cylinder positioned in the approximate center of casing 210 which is provided at the lower end with a conduit 246 for introduction of coolant and at the upper end with a conduit 250 for removal of coolant. Numeral 252 designates conduit for introducing a liquid into liquid distributor 254 which serves to distribute the liquid in the form of a curtain on the outside upper wall of cylinder 244. Numeral 256 designates a conduit for removing one component of the gas mixture and is connected to the approximate center of cylinder 210. Conduit 258, connected to the top of cylinder 210, serves to remove a separated gas stream.

In operating the apparatus illustrated in Figure 11, a vapor is introduced through conduits 220, 222, 224 and 226. This vapor passes through openings 228, 230, 232 and 234, respectively, and is deflected upwardly by baffles 236, 238, 240 and 242. Assuming that two gas streams are to be separated into the components A, B and C, one stream being composed mostly of A and B and some C while the other gas stream contains mostly B and C and some A, and assuming that component A is most diffusible, component C is least diffusible and component B is intermediate in diffusibility, then the gas stream containing mostly A and B and some C would be introduced with the condensable vapor into conduit 220 and would pass through openings 228 into the separating zone between casing 210 and central cylinder 244. The separating action described previously takes place and the least diffusible component C collects near the curtain flowing down the wall of cylinder 244, which curtain is formed by liquid introduced through conduit 252 and distributed by liquid distributor 254. The most diffusible component A collects near the wall of casing 210 and is removed with the stream withdrawn through conduit 258. The stream enriched in least diffusible component is caused to flow downwardly by the liquid curtain on cylinder 244 and eventually is removed from the bottom of the apparatus through the base of casing 210. The other gas stream containing mostly B and C and some A is introduced with the vapor through conduit 224. This mixture passes through openings 232 and is deflected upwardly by baffle 240. In this portion of the apparatus i. e. the portion surrounded by jacket 216 a similar separating action takes place, the most diffusible passing upwardly along the wall of casing 210 and the least diffusible passing downwardly with the liquid curtain along the wall of concentric cylinder 244. The up and down flowing streams will contain some of the component B having intermediate diffusibility and this component will become enriched and will exist in higher concentration in the zones surrounded by jackets 216 and 214. There will thus be established in the apparatus an upwardly and downwardly flowing stream which will comprise mainly component B in the central portion, which component is removed through conduit 256. The downwardly flowing stream will comprise mainly least diffusible component C near the base of the column and will be removed through the lower end of conduit 210. The upwardly flowing stream will comprise mainly most diffusible component A in the upper part of the apparatus and will be removed through conduit 258. These will be a continuous interchange of components in the upwardly and downwardly flowing streams similar to that which takes place in a fractionating column with formation of three streams enriched in the three components.

The dragging effect of the liquid film used in the apparatus of Figures 6 to 11 constitutes a convenient means for removing a stream enriched with respect to one component of the gas mixture from the point or zone of enrichment to a zone of higher enrichment and finally from the separating apparatus. This withdrawing action exerts its effect on the other portion of the gas mixture since the down flowing stream of gas, if not removed as fast as formed, must necessarily result in an up-flow of the other portion by displacement effect. While apparatus of this type operates best in a vertical position it will operate as long as gravity or some other force will satisfactorily cause the liquid to flow over the condensing surface. The liquid is advantageously miscible with the actuating condensable vapor. While it may or may not be the same substance as the actuating vapor it is best that it be the same when using still vapors as the actuating medium. This removing action can be accomplished mechanically and such apparatus is illustrated in Figures 12 and 13.

Figures 12, 13:
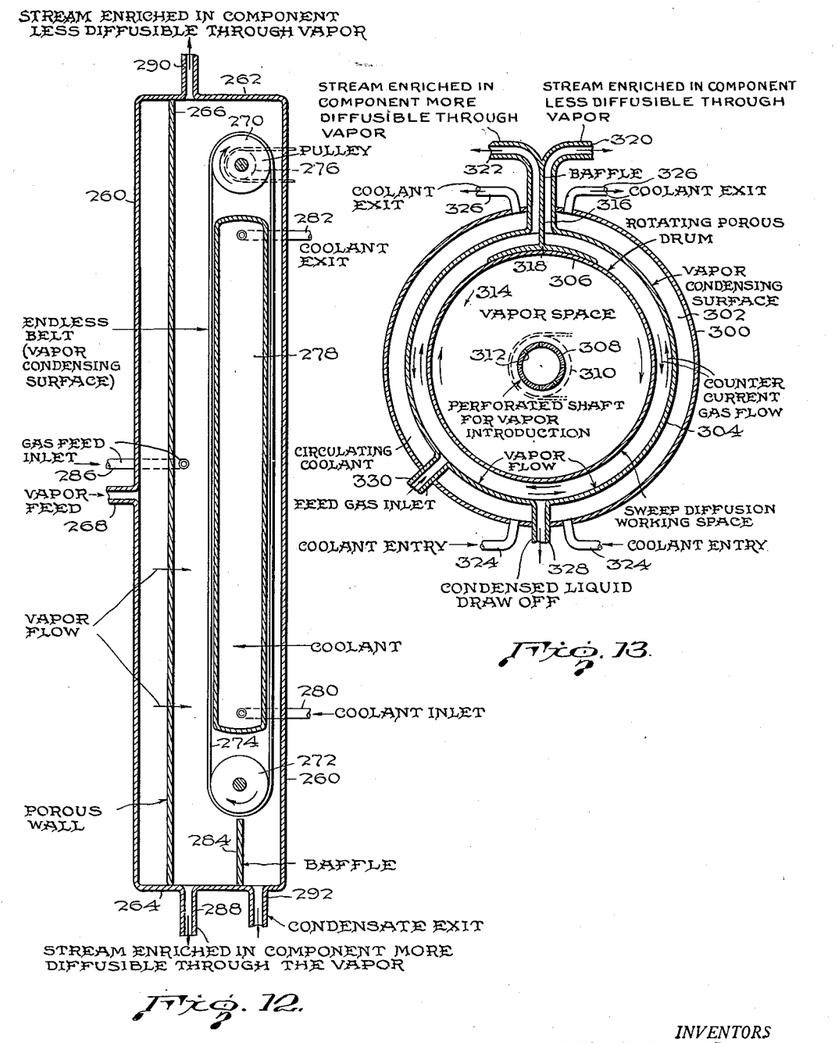
Figure 12 is a vertical section of apparatus provided with a moving endless belt for causing countercurrent flow of separated gas streams.
Figure 13 is a vertical section of apparatus provided with a rotating drum for causing countercurrent flow of the separated gas streams.

Referring to Figure 12, numeral 260 designates a rectangular casing provided at the upper end with an end plate 262 and at the lower end with a base 264. Numeral 266 designates a porous partition integral with the walls and ends of casing 260 which forms an enclosed rectangular space into which a condensable vapor is introduced through conduit 268. Numerals 270 and 272 designate rotatable cylinders upon which is mounted a metal endless belt 274. Cylinder 270 is driven by pulley 276. Numeral 278 designates a rectangular closed cooling member positioned inside the space enclosed by endless belt 274 the walls of which are in contact with belt 274. Numeral 280 designates a conduit for introducing cooling fluid into 278 and numeral 282 designates a conduit for removing cooling fluid from 278. Numeral 284 indicates a baffle integral with the base plate 264, which baffle extends upwardly into close proximity with cylinder 272. Numeral 286 designates a conduit for introducing the gas mixture to be separated into the space between porous wall 266 and endless belt 274. Numeral 288 designates a conduit for removing more diffusible component from the base of the separating chamber while conduit 290 is provided for removing less diffusible from the top of the apparatus. Conduit 292 is provided for removing the condensable vapor in the form of liquid.

In operating the apparatus illustrated in Figure 12, endless belt 274 is put into motion by power applied to pulley 276, the direction of rotation being clockwise, as indicated in the drawing. Cooling fluid is introduced through conduit 280 and removed through conduit 282 and vapor is introduced through conduit 268 and passes through porous plate 266. This vapor passes across the separating zone from plate 266 to moving belt 274 and is condensed on the surface thereof. This condensate drops off the lower portion of the belt in the space between the lower wall of casing 260 and baffle 284 and is withdrawn through conduit 292. The gas mixture to be separated is introduced through conduit 286 where it is mixed with the condensable vapor. The more diffusible component of this gas collects near porous wall 266 while the less diffusible collects near moving belt 274. The less diffusible is caused to rise by the upward motion of the endless belt and the displacing effect of this upwardly moving body of less diffusibility causes the more diffusible to flow downwardly. The less diffusible is removed from conduit 290 and the more diffusible from conduit 288.

Referring to Figure 13, numeral 300 indicates a cylindrical casing closed at each end by a circular end plate 302. Numeral 304 designates another cylinder of smaller diameter positioned inside and approximately concentric with cylinder 300, the ends of cylinder 300 being integral with circular end plates 302. Numeral 306 designates a porous drum of smaller diameter than cylinder 304, provided with end plates 314, positioned inside cylinder 304 and rotatably mounted upon a shaft 308 driven by pulley 310. Numeral 312 designates a plurality of perforations in shaft 308 for passage of condensable vapor therethrough.

Numeral 316 indicates a baffle provided with a lower circular plate 318, which plate makes light contact with the outside upper surface of cylinder 306 so as to divide the annular space between 304 and 306. Numeral 320 designates a conduit connected to one side of baffle 316 and numeral 322 designates a conduit connected to the opposite side of baffle 316. Numeral 324 designates conduits for introducing cooling fluid into the lower portion of the annular space between cylinders 300 and 304, and numeral 326 designates conduits for removing cooling fluid from the upper part of this same space. Numeral 328 designates a conduit for removing liquid condensate from the lower portion of the annular space between cylinder 304 and porous cylinder 306, and numeral 330 designates a conduit for introducing the gas mixture to be separated into this space.

In operating the apparatus illustrated in Figure 13, drum 306 and integral end plates 314 are caused to rotate in a clockwise direction by force applied to shaft 308 by means of pulley 310. Vapor is introduced through shaft 308 and passes through openings 312 into cylinder 306 and thence through the porous wall thereof. This vapor condenses on the inside wall of cylinder 304 and flows by gravity into conduit 328 through which it is removed. Cooling fluid is introduced into conduits 324 and is removed through conduits 326 and the gas mixture to be separated is introduced through conduit 330. This gas diffuses through the condensable vapor in the annular space between the cylinders 304 and 306 and a separation takes place as previously described, the more diffusible being in greater concentration near the surface of rotating drum 306 and being caused to pass by the dragging action of this rotating drum into conduit 322. The less diffusible collects near the wall of cylinder 304 and, due to displacing action as previously indicated, collects in greater concentration near withdrawal conduit 320 and is withdrawn therethrough. Baffle 316 prevents intermixture of the two different components collecting on each side thereof near the upper part of the apparatus.

It will be noted that the vapor condenses on the inside wall of 304 and flows into conduit 328. On the left-hand portion of this cylinder 304, this downwardly flowing condensate will assist the downward flow of less diffusible and thus increase its flow toward withdrawal conduit 320. On the other hand, the downward flow of this condensate on the right-hand portion of cylinder 304 will correspondingly decrease the upward flow of the less diffusible along the inside wall of 304 so that the two effects compensate for each other and the over-all effect is approximately the same as if no liquid were present on the inside wall of cylinder 304. Since the amount of condensate is relatively small, the adverse dragging effect on the right-hand side, and by the same token, the desirable dragging effect on the left-hand wall is not particularly great.

The point of introduction of the gas mixture into a multistage separator (Figs. 6 to 13) can be varied according to the nature and amount of components to be separated. In general it is advantageous to introduce it at a point where the composition of the feed mixture is about the same as that of the gas in the separating space. If fairly pure less diffusible component is desired the feed would advantageously be at or near the end where the stream enriched in more diffusible components is withdrawn while if fairly pure more diffusible component is of main interest the feed would be at or near the end where the stream enriched in less diffusible component is withdrawn.

The effective length of the separating apparatus determines the degree of separation in the multistage separator. A plurality of units can be connected in series in order to increase the degree of separation, i. e. the operation may be repeated on the tops or bottoms. Also in order to improve the degree of separation a part or all of one of the separated streams may be returned to the column for reflux. This reflux could be returned with the sweep vapor or to any point in the column.

It will be noted that in the apparatus illustrated in the drawings there is a substantially unobstructed flow of vapor through the separating zone to the region of removal where the vapor is condensed or otherwise removed, i. e. the vapor flow through the separating zone to the region of removal is not impeded by porous, perforated or other permeable membranes which offer material resistance to flow. This contributes to the separation capacity and other desirable characteristics of our invention.

In many cases, such as when large volumes of condensable vapor are used, it may not be necessary to employ a flowing cold liquid curtain as in Figures 6 to 11, since the volume of liquid condensed on the condensing surface may in certain cases be sufficient to form the flowing film or curtain. Also it is feasible, but not advantageous, to form the vapor in the separating zone. This can be accomplished by heating the tubes 54 (Figure 6) or 76 (Figure 7) and flowing thereover the liquid which is to serve as the source of vapor.

With difficult separations (i. e. where the constituents have about the same diffusivity, as with isotopes) it is theoretically desirable to select a sweep vapor which has a high molecular weight since such higher molecular weight sweep vapors give better separations under such circumstances.

EXAMPLE 1

Two runs were performed in apparatus similar to that illustrated in Figure 5 to separate a mixture of hydrogen and natural gas. An ice bath was used to cool the liquid condensate serving as a condensing surface. The results are given in Table 1.

Table 1.—Single-stage sweep diffusion unit separation of hydrogen from natural gas

| Run | 1 | 2 |
|---|---|---|
| Mole Per Cent H₂ in Feed | 45.0 | 45.0 |
| Mole Per Cent H₂ in Bottoms | 44.0 | 44.6 |
| Mole Per Cent H₂ in Tops | 45.9 | 45.3 |
| Bottoms Flow, standard cubic feet per hour (SCFH) at 0° C. and 1 atm | 0.670 | 0.548 |
| Tops Flow, SCFH | 0.611 | 0.527 |
| Total Flow, SCFH | 1.281 | 1.075 |
| Moles Tops/Mole Feed | 0.477 | 0.491 |
| Approximate Distance between Tops Draw-off and Liquid Surface, cm | 3½ | 1½ |
| Approximate Distance between Bottoms Draw-off and Liquid Surface, cm | ¼ | ¼ |
| Vapor | steam | steam |
| Vapor Consumption, Lb./Hr | 0.7 | 0.5 |
| Bottoms Temperature, ° C | 36.0 | 42.0 |
| Pressure, p. s. i. a | 17.4 | 17.4 |

EXAMPLE 2

A mixture of hydrogen and natural gas was separated in apparatus the same as that illustrated in Figure 6.

The Alundum tube had an outside diameter of .75 inch and a height of 18 inches. The condensing tube had an inside diameter of 1.22 inches and the gas mixture was introduced 10.8 inches from the bottom of the Alundum tube. No fluid was used in the cooling jacket. The liquid curtain was water and the steam entered the Alundum tube at several centimeters of mercury pressure above the column pressure and at the saturation temperature corresponding to the steam pressure. The results are given in Table 2 wherein the runs are numbered approximately in the order of increasing vapor consumption for readier evaluation of the results.

Table 2.—Data on separation of hydrogen from natural gas

| Run | 1 | 2 | 3 | 4 | 5 | 6 | 7 | 8 | 9 |
|---|---|---|---|---|---|---|---|---|---|
| Feed | (1) | (1) | (1) | (1) | (1) | (1) | (1) | (1) | (1) |
| Mole Per Cent $H_2$ in Feed | 44.9 | 44.9 | 44.9 | 44.9 | 44.9 | 45.8 | 44.9 | 44.9 | 44.9 |
| Mole Per Cent $H_2$ in Bottoms | 44.3 | 40.2 | 37.7 | 35.7 | 26.5 | 6.8 | 36.5 | 30.2 | 36.4 |
| Mole Per Cent $H_2$ in Tops | 47.2 | 53.4 | 50.3 | 50.8 | 50.1 | 78.2 | 52.7 | 52.0 | 52.3 |
| Bottoms Flow, SCFH | 6.6 | 5.65 | 4.21 | 3.20 | 2.03 | 0.374 | 3.94 | 2.49 | 4.00 |
| Tops Flow, SCFH | 2.0 | 2.79 | 4.44 | 5.26 | 6.53 | 0.447 | 4.31 | 5.78 | 4.62 |
| Total Flow, SCFH | 8.6 | 8.44 | 8.65 | 8.46 | 8.56 | 0.821 | 8.25 | 8.27 | 8.62 |
| Moles Tops/Mole Feed | 0.233 | 0.330 | 0.513 | 0.622 | 0.763 | 0.545 | 0.522 | 0.699 | 0.536 |
| Liquid Curtain | (2) | (2) | (2) | (2) | (2) | (2) | (2) | (2) | (2) |
| Vapor | (3) | (3) | (3) | (3) | (3) | (3) | (3) | (3) | (3) |
| Vapor Consumption, Lb./Hr | 0.90 | 1.46 | 1.41 | 1.43 | 1.42 | 1.77 | 2.00 | 2.01 | 2.1 |
| Column Pressure, p. s. i. a | 17.6 | 17.4 | 18.0 | 17.9 | 17.9 | 17.5 | 17.4 | 17.4 | 17.4 |
| Bottoms Temperature, °C | 32.0 | 33.9 | 33 | 33.5 | 32.4 | 36.3 | 37.0 | 36.5 | 39.8 |
| Tops Temperature, °C | 32.0 | 33.0 | 32 | 32.5 | 32.5 | 36.0 | 45.0 | 50.0 | 52.8 |

1 Hydrogen-natural gas.
2 Water.
3 Steam.

EXAMPLE 3

A mixture of oxygen and nitrogen (air) was separated in the same apparatus and under the same conditions described in Example 2. The results are given in Table 3.

Table 3.—Data on separation of oxygen from nitrogen in air

| Run | 1 | 2 |
|---|---|---|
| Feed | Air | Air |
| Mole Per cent $O_2$ in Feed | 21.0 | 21.0 |
| Mole Per cent $O_2$ in Bottoms | 20.1 | 20.1 |
| Mole Per cent $O_2$ in Tops | 21.5 | 21.4 |
| Bottoms Flow, SCFH | 1.268 | 0.1404 |
| Tops Flow, SCFH | 1.250 | 0.1192 |
| Total Flow, SCFH | 2.518 | 0.2596 |
| Moles Tops/Mole Feed | 0.497 | 0.460 |
| Liquid Curtain | Water | Water |
| Vapor | Steam | Steam |
| Vapor Consumption, Lb./Hr | 2.55 | 2.64 |
| Column Pressure, p. s. i. a | 17.5 | 17.5 |
| Bottoms Temperature, °C | 34.3 | 34.0 |
| Tops Temperature, °C | 40.0 | 35.8 |

EXAMPLE 4

A mixture of hydrogen and natural gas was separated in an apparatus the same as that illustrated in Figure 10. The main column had a diameter of 31 mm. and a height of 18". The inside tube which served as a guide for a water curtain had an outside diameter of 17 mm. Steam entered the outside tube from a steam jacket through 16 holes, 1.5 mm. in diameter, equally spaced around the wall of the outside tube. Eight of the holes were located at the bottom of the column and the other 8 were located 10.8" above the lower ones. An annular baffle was located adjacent to each set of the holes to direct the incoming steam upwards. The feed gas was pre-mixed with steam flowing into the upper group holes. Results obtained with this apparatus are shown on Table 4, arranged in the order of increasing feed rate.

Table 4.—Feed mixed with vapor feed to upper vapor inlet

| Run No. S3 | 15 | 14 | 13 | 12 | 11 | 16 |
|---|---|---|---|---|---|---|
| Feed | (1) | (1) | (1) | (1) | (1) | (1) |
| Mole Per Cent $H_2$ in Feed | 51.6 | 51.6 | 51.6 | 51.6 | 51.6 | 51.6 |
| Mole Per Cent $H_2$ in Bottoms | 22.6 | 29.7 | 35.3 | 40.5 | 42.4 | 45.9 |
| Mole Per Cent $H_2$ in Tops | 75.7 | 72.1 | 67.5 | 61.8 | 60.0 | 57.1 |
| Bottoms Flow, SCFH | 0.467 | 1.06 | 1.90 | 3.07 | 3.92 | 6.10 |
| Tops Flow, SCFH | 0.571 | 1.21 | 2.06 | 3.43 | 4.46 | 6.64 |
| Feed Rate, SCFH | 1.038 | 2.27 | 3.96 | 6.50 | 8.38 | 12.74 |
| Moles Tops per Mole Feed | 0.550 | 0.533 | 0.520 | 0.528 | 0.532 | 0.521 |
| Bottoms Temperature, °C | 31.0 | 31.0 | 30.5 | 30.0 | 30.0 | 30.0 |
| Tops Temperature, °C | 31.5 | 31.0 | 31.5 | 33.0 | 37.0 | 42.0 |
| Column Pressure, p. s. i. a | 17.6 | 17.7 | 17.6 | 17.6 | 17.6 | 17.8 |
| Vapor | (2) | (2) | (2) | (2) | (2) | (2) |
| Vapor Consumption, lb./hr | 1.85 | 1.81 | 1.88 | 1.94 | 1.94 | 2.10 |
| Liquid Curtain | (3) | (3) | (3) | (3) | (3) | (3) |
| Liquid Downflow Rate, lb./hr | 182 | 182 | 182 | 185 | 185 | 182 |

1 Hydrogen-natural gas.
2 Steam.
3 Water.

Irrespective of steam rate, it is obvious from the foregoing examples that the most complete separation is obtained in run No. 6 of Example 2, where the feed rate is approximately one-tenth the rate of any of the other hydrogen-natural gas runs. However, in the evaluation of different runs, the degree of separation, the quantity separated, and the amount of energy expended in performing the separation are all important.

It is evident that at a feed rate of about 8.4 SCFH, Example 4, gave better separation than was obtained in the previous examples. This was at least partially due to reduction in turbulence and possibly in channeling effected by the method used for introducing the gas mixture. At lower feed rates, Example 2 gave better separation than was obtained in the other examples.

The degree of separation obtained in Example 3 is smaller than that obtained in hydrogen-natural gas separation because the diffusivities of oxygen and nitrogen through steam are more nearly equal than those of hydrogen and natural gas. However, a real separation was obtained, as shown by the values in the table. Their accuracy is approximately ±0.2 mol per cent. Oxygen is enriched in the top stream, as was predicted by the fact that oxygen is more diffusible through steam than nitrogen.

There are numerous industrial applications of our invention, which may be referred to as sweep diffusion, all of which may conveniently be classified according to the type of operation performed by the sweep diffusion process. Thus, besides the separation of the components of a gaseous mixture, sweep diffusion may be used for separating in the vapor-phase materials that are normally liquids at atmospheric conditions, for separating vapors from gases, for separating fine solid or liquid particles from gases and for humidifying air. It will be noted from the above disclosure that in our process, condensation of vapors and separation of a gas and/or vapor mixture by absorption can be accomplished. In some applications one of the separated streams may be condensed in the apparatus and leave the apparatus as a liquid.

Our process can be applied to many separation problems. It is useful for the separation of helium from natural gas, nitrogen from natural gas, carbon dioxide from natural gas, hydrogen sulfide from natural gas; in the separation of hydrogen from gaseous hydrocarbons, water gas, producer gas, coke oven gas, in the separation of oxygen from air; in the separation of argon, neon, krypton, xenon and nitrogen from air. The process is also useful for separating many systems which form azeotropic mixtures in distillation, for example, ethyl alcohol may be separated from water in the vapor phase by this process. The process is useful for separating light oils from coke oven gas, and natural gasoline from casinghead gas. The process is also useful for separating finely divided solids or liquids from gases, such as for separating the suspended matter in smoke and for recovering iron ore from blast furnace effluents.

By using a suitable absorbing liquid for the curtain, an increased separation may be obtained. Thus in separating hydrogen, carbon monoxide, and carbon dioxide mixtures using water or a monoethanolamine solution as the curtain, an increased separation would be observed since the curtain would absorb the carbon dioxide.

What we claim is:

1. The process of partially separating components of a gas mixture which comprises establishing a substantially unobstructed flow of vapor through a separating zone, distributing the gas mixture in the separating zone, removing part of said vapor by causing it to undergo a change of phase in a region of removal within the separating zone, thereby establishing a concentration gradient in the separating zone, and withdrawing at least two streams of different compositions from the separating zone at different distances from said region of removal.

2. The process of partially separating components of a gas mixture which comprises establishing a substantially unobstructed flow of vapor through a separating zone, distributing the gas mixture in the separating zone, removing part of said vapor by causing it to undergo a change of phase in a region of removal within the separating zone, thereby establishing a concentration gradient in the separating zone, and withdrawing at least two streams of different compositions from the separating zone at different distances from said region of removal and repeating the operation on one of said streams.

3. The process of partially separating components of a gas mixture which comprises establishing a substantially unobstructed flow of condensable vapor through a separating zone, distributing the gas mixture in the separating zone, condensing part of said condensable vapor in a region of condensation within the separating zone, thereby establishing a concentration gradient in the separating zone, and withdrawing at least two streams of different compositions from the separating zone at different distances from said region of condensation.

4. The process of partially separating components of a gas mixture which comprises establishing a substantially unobstructed flow of condensable vapor through a separating zone, distributing the gas mixture in the separating zone, condensing part of said condensable vapor in a region of condensation within the separating zone, thereby establishing a concentration gradient in the separating zone, withdrawing at least two streams of different compositions from the separating zone at different distances from said region of condensation and returning to the separating zone at least part of one of said streams.

5. The process of partially separating components of a gas mixture which comprises establishing a substantially unobstructed flow of steam through a separating zone, distributing the gas mixture in the separating zone, condensing part of said steam in a region of condensation within the separating zone, thereby establishing a concentration gradient in the separating zone, and withdrawing at least two streams of different compositions from the separating zone at different distances from said region of condensation.

6. The process of partially separating components of a gas mixture wherein waste energy from still vapors is utilized which comprises establishing a substantially unobstructed flow of condensable vapor, obtained from the distillation of a mixture, through a separating zone, distributing the gas mixture in the separating zone, condensing part of said condensable vapor in a region of condensation within the separating zone, thereby establishing a concentration gradient in the separating zone, and withdrawing at least two streams of different compositions from the separating zone at different distances from said region of condensation.

7. The process of partially separating components of a gas mixture which comprises establishing a substantially unobstructed flow of condensable vapor through a separating zone, distributing the gas mixture in the separating zone, condensing part of said condensable vapor in a region of condensation within the separating zone, thereby establishing a concentration gradient in the separating zone, withdrawing at least two streams of different compositions from the separating zone at different distances from said region of condensation and repeating the operation on at least one of the streams so withdrawn.

8. The process of partially separating components of a gas mixture which comprises establishing a substantially unobstructed and uniform flow of condensable vapor through a separating zone, distributing the gas mixture in the separating zone, condensing part of said condensable vapor in a region of condensation within the separating zone, thereby establishing a concentration gradient in the separating zone, and withdrawing at least two streams of different compositions from the separating zone at different distances from said region of condensation.

9. The process of partially separating components of a gas mixture which comprises establishing a substantially unobstructed flow of vapor through a separating zone, distributing the gas mixture in the separating zone, removing part of said vapor by causing it to undergo a change of phase in a region of removal within the separating zone, thereby establishing a concentration gradient in the separating zone, causing part of the gas to flow in an extended path near said region of removal toward one extremity of the separating zone, causing another part of the gas to flow countercurrent to the first mentioned part in an extended path more distant from the region of removal and toward the opposite extremity of the separating zone and withdrawing from said extremities streams of different compositions.

10. The process of partially separating components of a gas mixture which comprises establishing a substantially unobstructed flow of vapor through a separating zone, distributing the gas mixture in the separating zone, removing part of said vapor by causing it to undergo a change of phase in a region of removal within the separating zone, thereby establishing a concentration gradient in the separating zone, causing a part of the gas to flow without substantial turbulence in an extended path near said region of removal toward one extremity of the separating zone, causing another part of the gas to flow countercurrent to the first mentioned part without substantial turbulence in an extended path more distant from the region of removal and toward the opposite extremity of the separating zone and withdrawing from said extremities streams of different compositions.

11. The process of partially separating components of a gas mixture which comprises establishing a substantially unobstructed flow of vapor through a separating zone, distributing the gas mixture in the separating zone, removing part of said vapor by causing it to undergo a change of phase in a region of removal within the separating zone, thereby establishing a concentration gradient in the separating zone, causing a part of the gas to flow by the dragging action of a moving liquid layer in an extended path near said region of removal toward one extremity of the separating zone, causing another part of the gas to flow countercurrent to the first mentioned part in an extended path more distant from the region of removal and toward the opposite extremity of the separating zone and withdrawing from said extremities streams of different compositions.

12. The process of at least partially separating components of a gas mixture which comprises establishing an approximately radial substantially unobstructed flow of a condensable vapor across an annular space bounded by approximately vertical concentric cylindrical surfaces, causing a liquid to flow in the form of a layer down one of said surfaces, condensing at least part of the condensable vapor on said liquid layer, distributing the gas mixture in the condensable vapor and withdrawing at least two streams of gas, one from near that extremity of said surfaces toward which the liquid is flowing, and a second stream from a zone farther from said extremity.

13. The process of at least partially separating components of a gas mixture which comprises establishing an approximately radial substantially unobstructed flow of a condensable vapor across a plurality of annular spaces bounded by a plurality of pairs of approximately vertical concentric cylindrical surfaces, causing a liquid to flow in the form of a layer down one of each pair of said surfaces, condensing at least part of the condensable vapor on said liquid layers, distributing the gas mixture in the condensable vapor and withdrawing at least two streams of gas from each annular space, one from near that extremity of said surfaces toward which the liquid is flowing, and a second stream from a zone farther from said extremity.

14. Apparatus for at least partially separating components of a gas mixture which comprises a separating chamber, means positioned in the chamber for condensing condensable vapor, means for establishing a substantially unobstructed flow of condensable vapor to the condensing means, means for introducing the gas mixture into the condensable vapor before it reaches the condensing means, means for forming gas streams in zones at different distances from the condensing means, means for causing the separated streams to pass within the separating chamber approximately parallel to and countercurrent with each other and means for separating the gas streams after countercurrent passage.

15. Apparatus for at least partially separating components of a gas mixture which comprises a separating chamber, means positioned in the chamber for condensing condensable vapor, means for establishing a substantially unobstructed flow of condensable vapor to the condensing means, means for introducing the gas mixture into the condensable vapor before it reaches the condensing means, means for forming gas streams in zones at different distances from the condensing means, means for causing the separated streams to pass within the separating chamber approximately parallel to and countercurrent with each other and means for preventing turbulence in the streams during countercurrent flow.

16. Apparatus for at least partially separating components of a gas mixture which comprises a plurality of pairs of concentric cylinders forming a plurality of unobstructed approximately annular spaces therebetween, means for introducing a condensable vapor into each annular space, means for condensing the condensable vapor in a zone adjacent to one of each of the pairs of annular cylinders, means for adding the gas mixture to the condensable vapor and means for removing a separated stream of gas positioned near at least one of the extremities of each annular space.

17. Apparatus for at least partially separating components of a gas mixture which comprises concentric cylinders forming an approximately annular space therebetween, means for applying a layer of liquid onto one end of one of said cylinders, means for removing liquid from the opposite end of the same cylinder, means for introducing a condensable vapor into the annular space, means for adding the gas mixture to the condensable vapor and a conduit for removing a separated stream of gas positioned at approximately each end of the annular space.

18. Apparatus for at least partially separating components of a gas mixture which comprises concentric cylinders forming an approximately annular space therebetween, means for applying a layer of liquid onto one end of one of said cylinders, means for equally distributing said liquid on said surface as it flows thereover, means for removing liquid from the opposite end of the same cylinder, means for introducing a condensable vapor into the annular space, means for adding the gas mixture to the condensable vapor and a conduit for removing a separated stream of gas positioned at approximately each end of the annular space.

19. Apparatus for at least partially separating components of a gas mixture which comprises concentric cylinders forming an approximately annular space therebetween, means for introducing a streamlined flow of condensable vapor into the annular space and approximately parallel with the walls of the cylinders, means for condensing the condensable vapor in a zone adjacent to one of the annular cylinders, means for introducing a streamlined flow of the gas mixture into the annular space and approximately parallel with the walls of the cylinders, and means for removing separated streams of gas positioned near opposite extremities of the annular space.

20. Apparatus for at least partially separating components of a gas mixture which comprises a separating chamber, means positioned in the chamber for condensing condensable vapor, means for establishing a substantially unobstructed flow of condensable vapor to the condensing means in controlled amounts for each unit area of the condensing means, means for introducing the gas mixture into the condensable vapor before it reaches the condensing means, means for forming gas streams in zones at different distances from the condensing means, means for causing the separated streams to pass within the separating chamber approximately parallel to and countercurrent with each other, and means for separating the gas streams after countercurrent passage.

21. Apparatus for at least partially separating components of a gas mixture which comprises a separating chamber, means positioned in the chamber for condensing condensable vapor, means for establishing a substantially unobstructed flow of condensable vapor to the condensing means in approximately equal amounts for each unit area of the condensing means, means for introducing the gas mixture into the condensable vapor before it reaches the condensing means, means for forming gas streams in zones at different distances from the condensing means, means for causing the separated streams to pass within the separating chamber approximately parallel to and countercurrent with each other, and means for separating the gas streams after countercurrent passage.

JOHN R. BOWMAN.
MARIO T. CICHELLI.

REFERENCES CITED

The following references are of record in the file of this patent:

UNITED STATES PATENTS

| Number | Name | Date |
|---|---|---|
| 1,881,490 | Gmelin et al. | Oct. 11, 1932 |
| 2,074,317 | Allan et al. | Mar. 23, 1937 |
| 2,255,069 | Maier | Sept. 9, 1941 |
| 2,437,594 | Denys | Mar. 9, 1948 |

FOREIGN PATENTS

| Number | Country | Date |
|---|---|---|
| 690,372 | France | June 17, 1930 |
| 733,079 | Germany | Mar. 18, 1943 |